(12) United States Patent
Shima

(10) Patent No.: US 7,042,582 B1
(45) Date of Patent: May 9, 2006

(54) PRINTER AND PRINTER DATA PROCESSING METHOD

(75) Inventor: Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/521,915

(22) Filed: Mar. 9, 2000

(30) Foreign Application Priority Data

Mar. 10, 1999 (JP) .................................. 11-062962

(51) Int. Cl.
G06K 15/02 (2006.01)
G06F 15/00 (2006.01)

(52) U.S. Cl. .................... 358/1.13; 358/1.15; 358/1.16

(58) Field of Classification Search ...... 358/1.14–1.17, 358/1.13; 708/100
See application file for complete search history.

(56) References Cited

U.S. PATENT DOCUMENTS

| | | | | |
|---|---|---|---|---|
| 4,130,865 A | * | 12/1978 | Heart et al. | 709/201 |
| 4,386,373 A | * | 5/1983 | Kondo et al. | 358/426.12 |
| 4,953,104 A | * | 8/1990 | Yeh et al. | 358/1.16 |
| 4,989,163 A | * | 1/1991 | Kawamata et al. | 358/1.6 |
| 5,021,975 A | * | 6/1991 | Yamanashi | 358/1.18 |
| 5,394,406 A | * | 2/1995 | Ono et al. | 714/748 |
| 5,548,740 A | | 8/1996 | Kiyohara | |
| 5,791,790 A | * | 8/1998 | Bender et al. | 400/61 |

FOREIGN PATENT DOCUMENTS

| | | |
|---|---|---|
| EP | 0 890 897 A2 | 1/1999 |
| JP | 4-07057 | 4/1992 |
| JP | 8-307620 | 11/1996 |
| JP | 9-169140 | 6/1997 |
| JP | 9-240076 | 9/1997 |
| JP | 09240076 A * | 9/1997 |

OTHER PUBLICATIONS

Japanese Office Action dated Nov. 26, 2004.

* cited by examiner

*Primary Examiner*—King Y. Poon
(74) *Attorney, Agent, or Firm*—Sughrue Mion, PLLC

(57) ABSTRACT

For a data transfer mode inside a printer, three types of modes of a mode via an auxiliary storage, a first bypass mode and a second bypass mode are provided. In the mode via an auxiliary storage, a communication task reaches an image generation task via a first buffer memory, a task for writing to a hard disk, HDD, a task for reading from HD and a second buffer memory. In the first bypass mode, data is transferred via the second buffer memory from the communication task without passing HDD. In the second bypass mode, data is transferred via the second buffer memory from the task for writing to HD without passing HDD. Data transfer modes are switched based upon whether there is data remaining on a transfer path or not and others.

13 Claims, 12 Drawing Sheets

PRINTER AND PRINTER DATA PROCESSING METHOD

BACKGROUND OF THE INVENTION

1. Field of the Invention

The present invention relates to a printer provided with an auxiliary storage such as a hard disk and a data processing method of the printer.

The present application is based on Japanese Patent Application No. Hei. 11-62962, which is incorporated herein by reference.

2. Description of the Related Art

In a conventional type printer, print job data from a host computer is stored in a receive buffer, the data stored in the receive buffer is sequentially interpreted, image data for printing and output is generated and printing is executed. As print job data has only to be sequentially interpreted and printed as described above, a so-called local printer has only to have a memory enough to temporarily store data for one band or data for one page for example according to the format of a print engine.

However, recently, as the coloring and others of a printed document are accelerated as a computer, image processing technology and others develop, the quantity of print job data increases. Also, in the case of a network printing system in which plural host computers share a printer via a network such as a local area network (LAN), print job data from the plural host computers is required to be sequentially processed. If a memory mounted in a printer has capacity for only one page, a host computer which desires to print a document for a few hundred pages is required to continue to sequentially send print job data for a long time. The other many host computers connected via the network are required to wait for a long time.

Therefore, a printer provided with an auxiliary storage such as a hard disk inside the printer so that received data is stored in the hard disk so as to promptly store enormous print job data and release a host computer early is recently proposed.

As a printer in which the above auxiliary storage is built can store a large quantity of data, it can release a host computer early. However, in the auxiliary storage, as a head is moved to a predetermined position on a rotated record medium and data is read/written, reading/writing speed is slower than that in case a memory such as RAM is accessed. For example, even if speed at which data is received from a network is 1 to 2 MB/s. and the processing of an image data generator is 1 MB/s., the data transfer rate of a hard disk drive (HDD) is normally approximately 500 kB/s. and is slow.

Therefore, when print job data is transferred via an auxiliary storage, it takes time for writing the data to the auxiliary storage and time for reading the data from the auxiliary storage and printing processing speed is greatly retarded. If a high speed interface, a direct memory access (DMA) and others are adopted, the data transfer rate of the auxiliary storage is enhanced, however, the manufacturing cost is increased.

SUMMARY OF THE INVENTION

The present invention is made in view of the above various problems and the object is to provide a printer and a data processing method of the printer wherein the early release of a host computer and the enhancement of printing processing speed are compatible by utilizing an auxiliary storage according to a data processed state inside the printer.

To achieve the above object, in a printer according to the present invention, a mode via an auxiliary storage in which data is transferred via the auxiliary storage and a bypass mode in which data is transferred without passing the auxiliary storage are prepared and are switched if necessary.

That is, the present invention is based upon a printer which can store data received via a network in an auxiliary storage and is characterized in that communication processing means for receiving data via a network, image data generation means for interpreting the above received data and generating image data, printing processing means for printing based upon the above generated image data and detection means for detecting a state in which the above received data is processed are provided and a mode via an auxiliary storage in which received data is input to the image data generation means via the auxiliary storage and a bypass mode in which received data is input to the image data generation means without passing the auxiliary storage are switched based upon a detected state in which data is processed.

For an auxiliary storage, a hard disk device (HDD) can be typically given, however, the present invention is not limited to this. As data received from a host computer is stored in an auxiliary storage in the mode via the auxiliary storage, the host computer can be early released. In the meantime, as received data is directly transferred to the image data generation means without passing the auxiliary storage in the bypass mode, time for writing to the auxiliary storage and time for reading from the auxiliary storage can be saved and printing processing speed can be enhanced.

The mode via the auxiliary storage and the bypass mode are switched based upon a data processed state detected by the detection means. For an example of switching based upon a data processed state, the mode via the auxiliary storage can be selected in case data being processed is stored in the auxiliary storage and the bypass mode can be selected in case data being processed is not stored in the auxiliary storage.

As the order of printing and others are disordered when data is transferred to the image data generator in the bypass mode in case data being processed is stored in the auxiliary storage, the modes are switched based upon whether data is stored in the auxiliary storage or not. The above data being processed means print job data to be printed or being printed.

Further, a first buffer memory is preferably provided on the input side of the auxiliary storage, a second buffer memory is provided on the output side of the auxiliary storage and data can be transferred via a memory block of each buffer memory. In this case, for the bypass mode, a first bypass mode in which communication processing means makes received data stored in the memory block of the second buffer memory can be adopted. As the image data generator receives data via the memory block of the second buffer memory, data can be transferred without passing the auxiliary storage if the data is directly stored in the memory block of the second buffer memory.

For a condition for switching to the first bypass mode, it can be given that (a1) no memory block storing data exists in the first buffer memory, that (a2) no data being processed is stored in the auxiliary storage and that (a3) an empty memory block exists in the second buffer memory.

That is, if no data being processed exists between the first buffer memory and the auxiliary storage and an empty memory block exists in the second buffer memory, the communication processing means can make received data directly stored in the memory block of the second buffer memory. In this case, a transfer period in the first bypass mode can be extended by setting so that the capacity of the second buffer memory is more than that of the first buffer memory because it takes much time to use all memory blocks of the second buffer memory.

Further, a second bypass mode in which the auxiliary storage is bypassed can be also adopted by transferring the contents of a memory block of the first buffer memory to a memory block of the second buffer memory separately from the first bypass mode. For a method of transferring data between memory blocks, two methods can be given. One is copying between memories that data stored in a memory block of the first buffer memory is read and is stored in an empty memory block of the second buffer memory. The other is block exchange that memory blocks themselves are transposed by exchanging information (an address and a pointer of a memory block) specifying a memory block of the first buffer memory and information specifying a memory block of the second buffer memory.

For a condition for switching to the second bypass mode, it can be given that (b1) no data being processed is stored in the auxiliary storage, that (b2) an empty memory block exists in the second buffer memory and that (b3) a memory block storing data exists in the first buffer memory.

For a bypass mode, both a first bypass mode and a second bypass mode may be also provided.

In the meantime, the present invention is also based upon a printer which can store data received via a network in an auxiliary storage and is characterized in that communication processing means for receiving data via a network, writing means for making data input from the communication processing means stored in an auxiliary storage, reading means for reading the data stored in the auxiliary storage, image data generation means for interpreting the input data and generating image data, printing processing means for printing based upon the generated image data, detection means for detecting data remaining in the auxiliary storage, a first buffer memory provided between the communication processing means and the writing means and provided with plural memory blocks and a second buffer memory provided between the auxiliary storage and the reading means and provided with plural memory blocks are provided, and is also characterized in that a mode via the auxiliary storage in which data received by the communication processing means is input to the image data generation means sequentially via the first buffer memory, the writing means, the auxiliary storage, the reading means and the second buffer memory and a bypass mode in which data received by the communication processing means is input to the image data generation means without passing the auxiliary storage are switched based upon a state in which the above each buffer memory is used and the quantity of data remaining in the auxiliary storage.

Also, the present invention can be also grasped as a data processing method of a printer. Further, the present invention can be also realized by instructing a printer to read and execute a predetermined program recorded on a record medium by a computer. For a record medium, a hard disk (HD), a floppy disk (FD), a compact disc (CD-ROM and CD-RAM), a memory, an IC card and others can be used. In addition, a communication medium such as downloading a program via a network can be also used. Features and advantages of the invention will be evident from the following detailed description of the preferred embodiments described in conjunction with the attached drawings.

DETAILED DESCRIPTION OF THE PREFERRED EMBODIMENTS

Referring to FIGS. 1 to 12, an embodiment of the present invention will be described in detail below.

Figure 1:
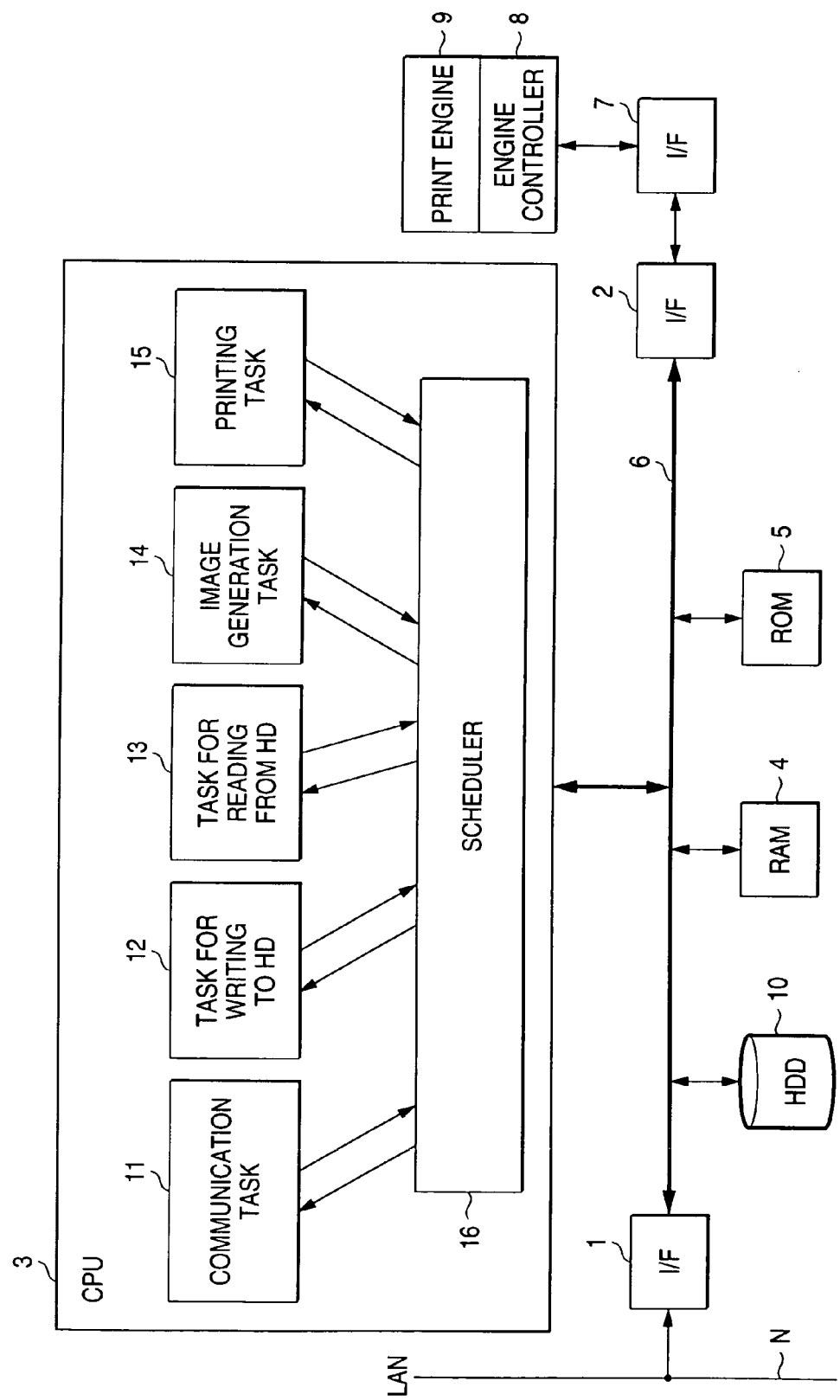
FIG. 1 is a block diagram showing the configuration of a printer equivalent to an embodiment of the present invention.

First, FIG. 1 is an explanatory drawing schematically showing the configuration of hardware of a printer equivalent to this embodiment. The printer is provided with interfaces 1 and 2, CPU 3, RAM 4, ROM 5, an engine controller 8, a print engine 9 and a hard disk device (HDD) 10.

The interfaces 1 and 2, CPU 3, RAM 4, ROM 5 and HDD 10 are mutually connected via a bus 6 and the engine controller 8 is connected to CPU 3 and others via the interfaces 2 and 7. CPU 3 executes data communication with a network N such as LAN via the interface 1 and executes data communication with the engine controller 8 via the interface 2.

CPU 3 executes a communication task 11, a task for writing to HD 12, a task for reading from HD 13, an image generation task 14 and a printing task 15. Each task 11 to 15 is switched, that is, CPU is managed based upon a scheduler 16 as a switching controller. The scheduler 16 allocates CPU (CPU execution right) to each task 11 to 15 according to preset priority. The communication task 11 and the printing task 15 can be also processed by each dedicated CPU.

When a packet is received from the network N, CPU is allocated to the communication task 11 as the communication processing means. In the communication task 11, extra data such as a checksum is deleted from the received packet, print data is extracted and is stored until a memory block becomes full. As described later, a memory block storing data is transferred to either of the task for writing to HD 12 (in a mode via an auxiliary storage) or the image generation task 14 (in a first bypass mode).

The task for writing to HD 12 as the writing means writes data input via a memory block from the communication task 11 to HDD 10 (the mode via the auxiliary storage) or transfers the data to the image generation task 14 (a second bypass mode) as described later. The task for reading from HD 13 as the reading means reads data stored in HDD 10, stores it in a memory block and transfers it to the image generation task 14.

When a memory block storing data is transferred, the image generation task 14 as the image data generation means is activated. The image generation task 14 reads print data in the memory block, generates a print image (a request for printing) and transfers the generated request for printing to the printing task 15.

When the request for printing is input from the image generation task 14, the printing task 15 as the printing processing means is activated and the engine controller 8 is driven according to the request for printing. Hereby, the engine controller 8 drives the print engine 9 to print in units of page. The engine controller 8 and the print engine 9 can be also represented as printing means or a printing section.

Figure 2:
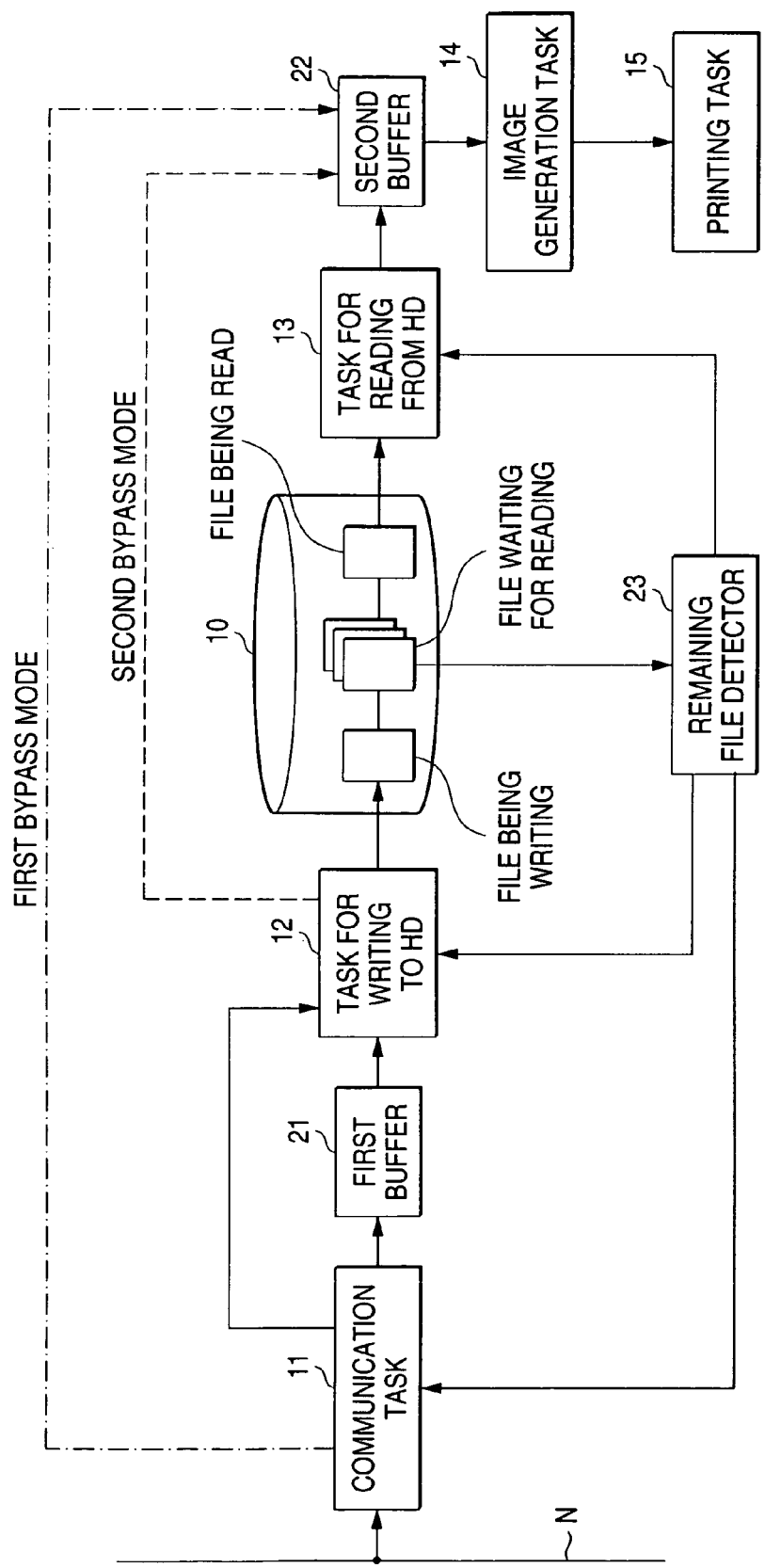
FIG. 2 is a block diagram showing the functional configuration of the printer.

Next, FIG. 2 is a block diagram showing functional configuration inside the printer. Thick arrows in FIG. 2 show the flow of data transfer in the mode via the auxiliary storage, an alternate long and short dash arrow shows the flow of data transfer in the first bypass mode and a dash arrow shows the flow of data transfer in the second bypass mode.

As shown in FIG. 2, data transfer between the communication task 11 and the task for writing to HD 12 is executed via a first buffer memory 21 and data transfer between the task for reading from HD 13 and the image generation task 14 is executed via a second buffer memory 22. More precisely, the second buffer memory 22 is used in both data transfer between the communication task 11 and the image generation task 14 (in the first bypass mode) and data transfer between the task for writing to HD 12 and the image generation task 14 (in the second bypass mode).

In HDD 10, three types of files composed of a file the data of which is being written in the task for writing to HD 12, a file already stored and waiting for processing and a file the data of which is being read in the task for reading from HD 13 may be generated. These three types of files are equivalent to data being processed or remaining data. Further, as shown in the task for writing to HD 12 in FIG. 3 and the task for reading from HD 13 in FIG. 4, if data exists in each task, the three types of files are also equivalent to data being processed or remaining data. The number of files waiting for reading is detected by a remaining file detector 23 and is respectively informed the communication task 11, the task for writing to HD 12 and the task for reading from HD 13.

The second buffer memory 22 is set so that the capacity is more than that of the first buffer memory 21. Hereby, time until data is stored in all memory blocks of the second buffer memory is extended. Therefore, transfer time in the first bypass mode is extended and printing processing time can be reduced.

Figure 3:
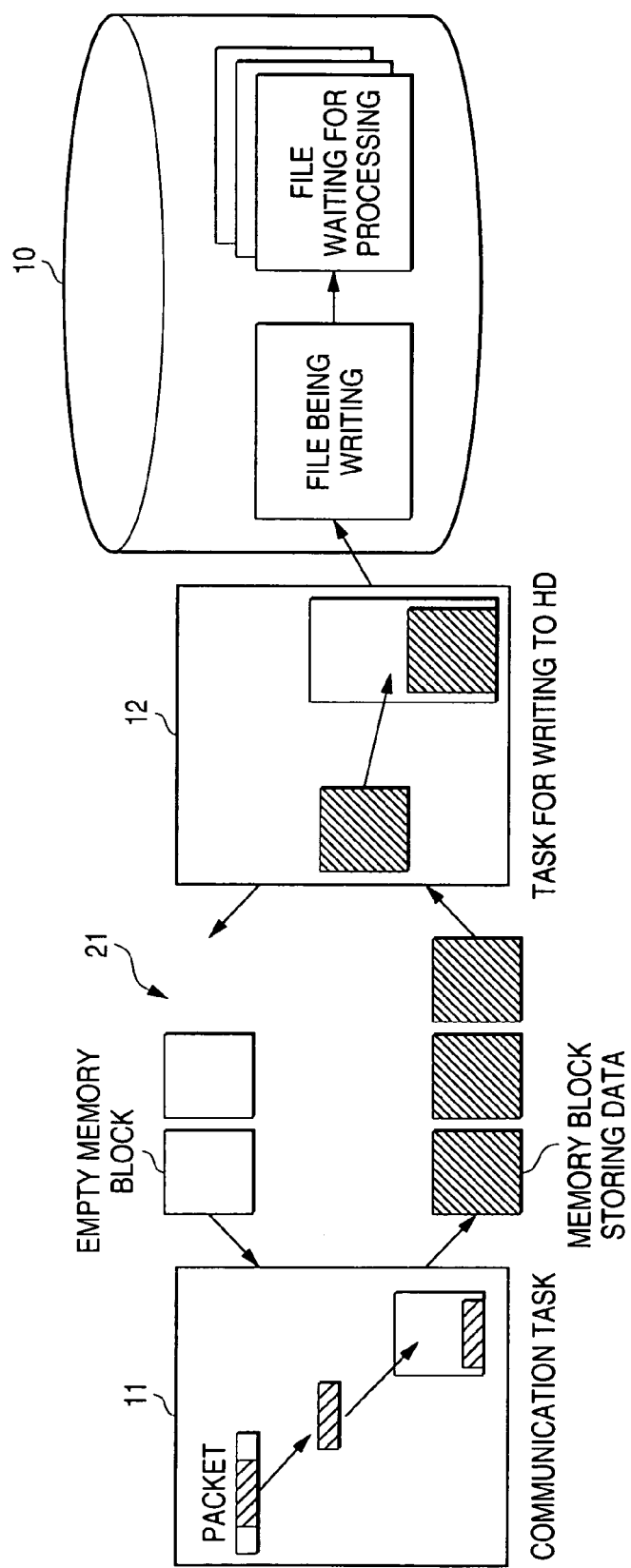
FIG. 3 is an explanatory drawing showing data transfer from a communication task to HDD.

FIG. 3 is an explanatory drawing schematically showing the flow of data transfer from the communication task 11 to HDD 10. In the communication task 11, extra data such as header information is deleted from a received packet and data is stored until empty memory blocks of the first buffer memory 21 respectively become full. In the task for writing to HD 12, when a full memory block is received, data is extracted from the memory block and is written to a file in HDD 10. The memory block from which data is extracted is returned to the first buffer memory 21. The reading of data from the memory block is sequentially processed according to first-in first-out (FIFO).

Figure 4:
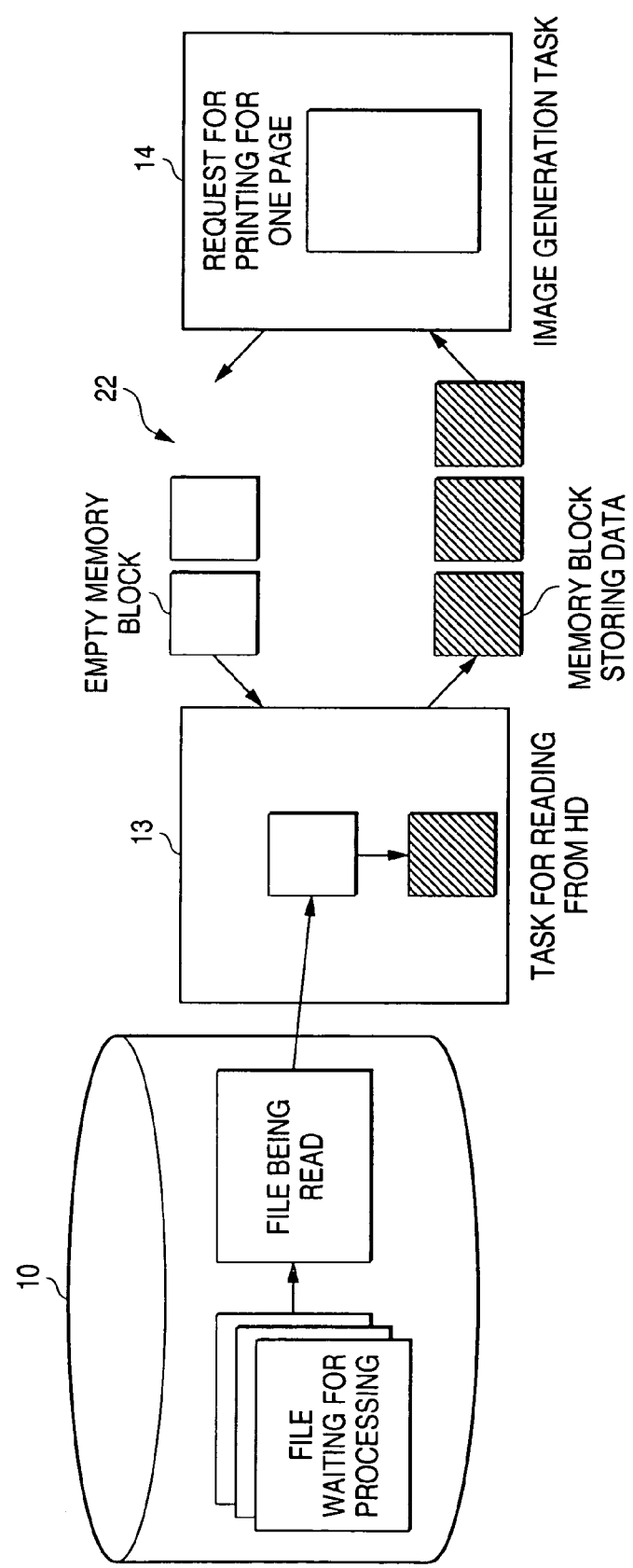
FIG. 4 is an explanatory drawing showing data transfer from HDD to an image generation task.

FIG. 4 is an explanatory drawing schematically showing the flow of data transfer from HDD 10 to the image generation task 14. In the task for reading from HD 13, data is read from a file in HDD 10, one empty memory block is extracted from the second buffer memory 22 and data is stored until the empty memory block becomes full. The above processing is repeated as long as empty memory blocks exist. In the image generation task 14, when a full memory block is received, data is extracted from the memory block, a request for printing for one page is generated and is input to the printing task 15. A memory block from which data is extracted and which becomes empty is returned to the second buffer memory 22.

Next, referring to FIGS. 5 to 12, the action of this embodiment will be described. In the following description, a step is abbreviated as S. For convenience of description, in the above drawings, a buffer memory is abbreviated as a buffer, a memory block is abbreviated as a block, and HDD is abbreviated as HD.

Figure 5:
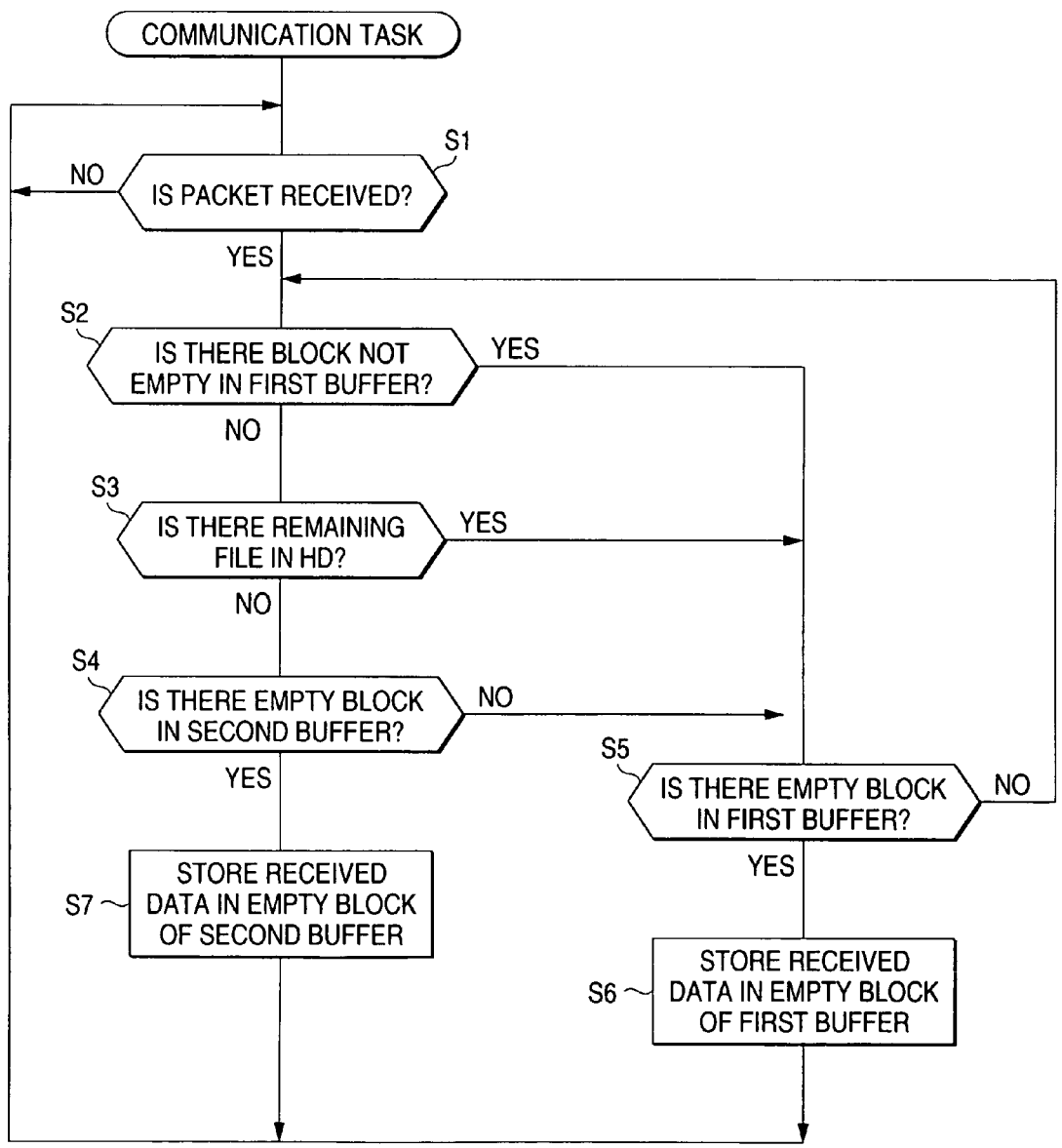
FIG. 5 is a flowchart showing the processing of the communication task.

First, FIG. 5 shows processing in the communication task 11. The communication task 11 is activated when packet data is received from the network N (S1: YES), next, a data transfer mode switching condition is determined. That is, it is respectively determined whether a memory block storing data and not empty exists in the first buffer memory 21 or not (S2), whether there is a file remaining in HDD 10 or not (S3) and whether there is an empty memory block in the second buffer memory 22 or not (S4).

In any case of a case that there is a full block in the first buffer memory 21 (S2: YES), a case that a file remaining in HDD 10 exists (S3: YES) and a case that there is no empty memory block in the second buffer memory 22 (S4: NO), it is checked whether there is an empty memory block in the first buffer memory 21 or not (S5) to enable data transfer in the mode via the auxiliary storage. If an empty memory block exists (S5: YES), one empty memory block is extracted from the first buffer memory 21 and data is stored until the memory block becomes full (S6). As data cannot be stored in case there is no empty memory block in the first buffer memory 21 (S5: NO), processing is returned to S2.

In the meantime, if no full memory block exists in the first buffer memory 21 (S2: NO), there is no file remaining in HDD 10 (S3: NO) and an empty block exists in the second buffer memory 22 (S4: YES), data can be transferred in the first bypass mode. In the first bypass mode, one empty memory block is extracted from the second buffer memory 22 and data is stored until the memory block becomes full (S7). That is, as no data being processed exists on a path from the first buffer memory 21 to HDD 10, no problem such as printing is disordered occurs even if HDD 10 is bypassed and data is transferred to the image generation task 14. As bypass transfer is disabled if there is no empty memory block in the second buffer memory 22, a state of the second buffer memory 22 is checked in S4. In an initial condition immediately after power on, as no file being processed exists in HDD 10 and a memory block in each buffer memory 21 and 22 is empty, data is transferred in the first bypass mode. If the capacity of the second buffer memory 22 is set so that it is more than the capacity of the first buffer memory when memory capacity is allocated to each buffer memory 21 and 22, transfer time in the first bypass mode can be extended and the whole processing time can be reduced. Concretely, if the whole memory capacity which can be used for a buffer memory is divided by the capacity of one memory block, the number of all memory blocks can be acquired. Approximately 20% of all the memory blocks is used for the first buffer memory 21 and approximately residual 80% can be used for the second buffer memory 22.

Figure 6:
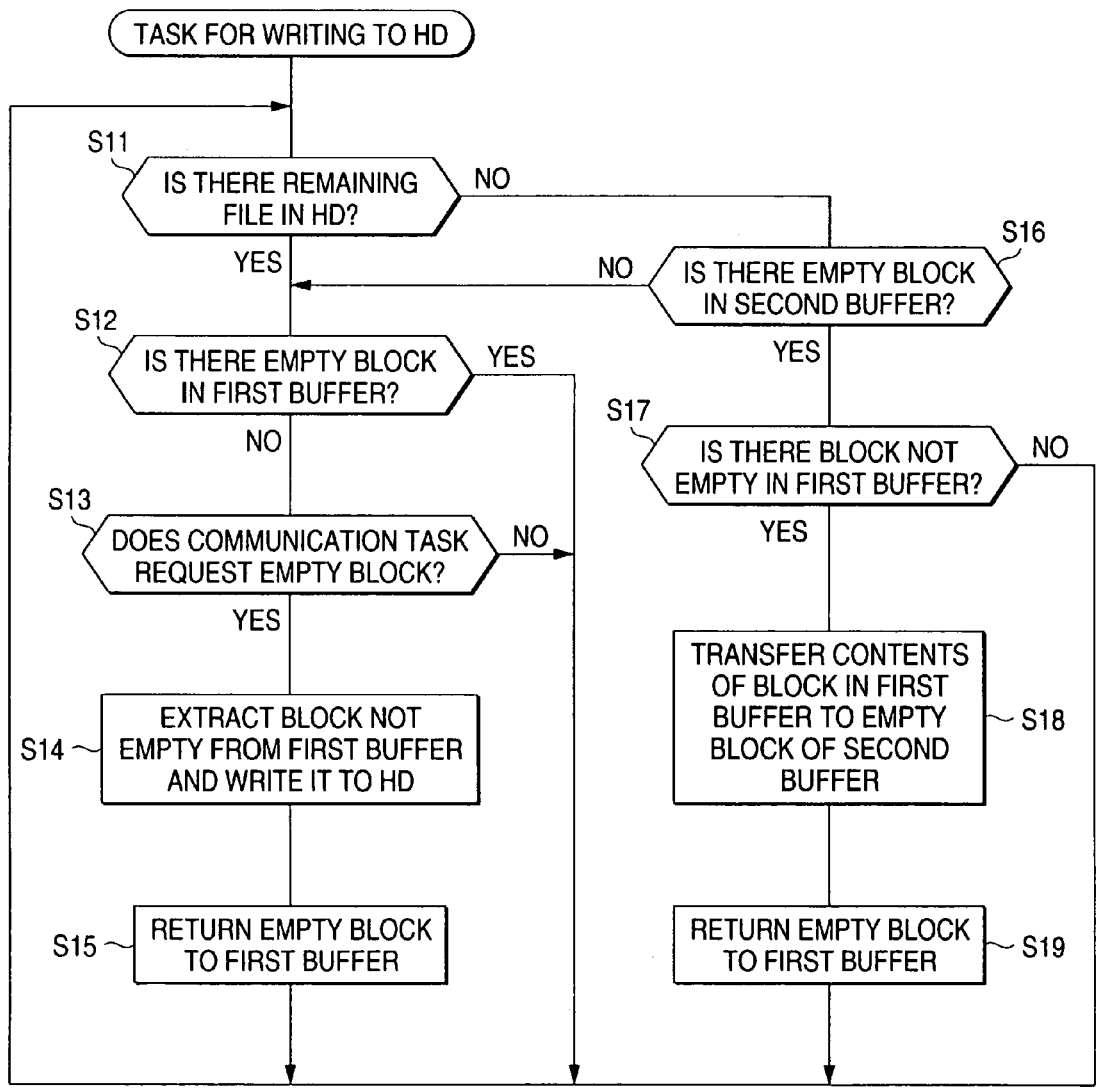
FIG. 6 is a flowchart showing the processing of a task for writing to HD.

Next, FIG. 6 shows the processing of the task for writing to HD 12. First, it is checked whether a file remaining in HDD 10 exists or not (S11). A case that a file remaining in HDD 10 exists (S11: YES) is equivalent to a case that HDD 10 cannot be bypassed to transfer data, that is, a case that data should be transferred in the mode via the auxiliary storage. Then, it is respectively checked whether there is an empty memory block in the first buffer memory 21 or not (S12) and whether in the communication task 11, the next print job is received and an empty memory block is required or not (S13). If there is no empty memory block in the first buffer memory 21 (S12: NO) and a new empty memory block is required in the communication task 11 (S13: YES), data is extracted from a memory block storing data and not empty to generate an empty memory block and a file composed of the data is written to HDD 10 (S14). The memory block from which the data is extracted is returned to the first buffer memory 21 (S15). Hereby, in the communication task 11, packet data newly received can be stored in the memory block.

If no file remaining in HDD 10 exists (S11: NO), it is checked whether an empty memory block exists in the second buffer memory 22 or not (S16). The reason is that if there is no empty memory block in the second buffer memory 22, HDD 10 cannot be bypassed. Next, it is checked whether there is a memory block storing data and not empty in the first buffer memory 21 or not and it is determined whether there is data which can be transferred from the first buffer memory to the second buffer memory or not (S17).

If S16 and S17 are both judged as YES, the contents (data) of a memory block in the first buffer memory 21 are(is) transferred to an empty memory block of the second buffer memory (S18). Data is read from the memory block in which the data is stored and the read data may be also copied and stored in an empty memory block or blocks themselves may be also exchanged by exchanging pointers of both memory blocks and others. The memory block from which data is transferred and which becomes empty is returned to the first buffer memory 21 (S19).

To describe more detailedly, if data is written to HDD 10 in S14, it is checked whether the data is data related to a new print job or not. If the data is data related to the new print job, a file is newly generated in HDD 10 and data is written to the file. In the meantime, in S14, it is also checked whether the corresponding data is the last data of a print job or not and if the data is the last data, a file is closed.

Figure 7:
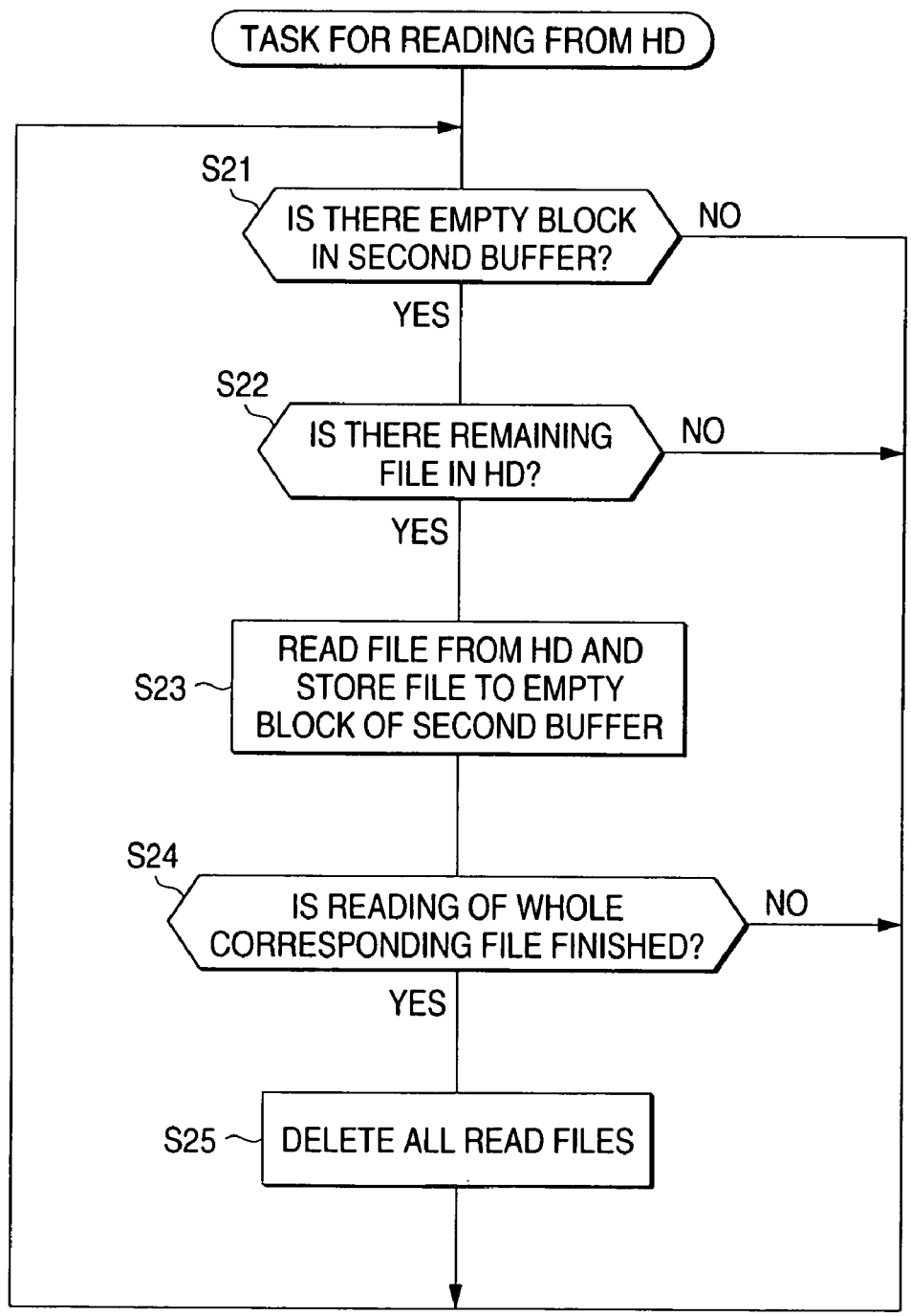
FIG. 7 is a flowchart showing the processing of a task for reading from HD.

Next, FIG. 7 shows the processing of the task for reading from HD 13. First, it s checked whether there is an empty memory block in the second buffer memory 22 or not (S21). Next, it is checked whether there is a file remaining in HDD 10 or not (S22). As data cannot be transferred if there is no empty memory block in the second buffer memory 22 (S21: NO) or if no file to be read exists in HDD 10 (S22: NO), processing is returned to S21 and waits there. In the meantime, if S21 and S22 are both judged as YES, data is read from a file in HDD 10 and the data is stored until an empty memory block of the second buffer memory 22 becomes full (S23).

It is determined whether the reading of the whole data of the file from which data is read in S23 is finished or not (S24) and if the whole data is read (S24: YES), the file is deleted (S25).

Figure 8:
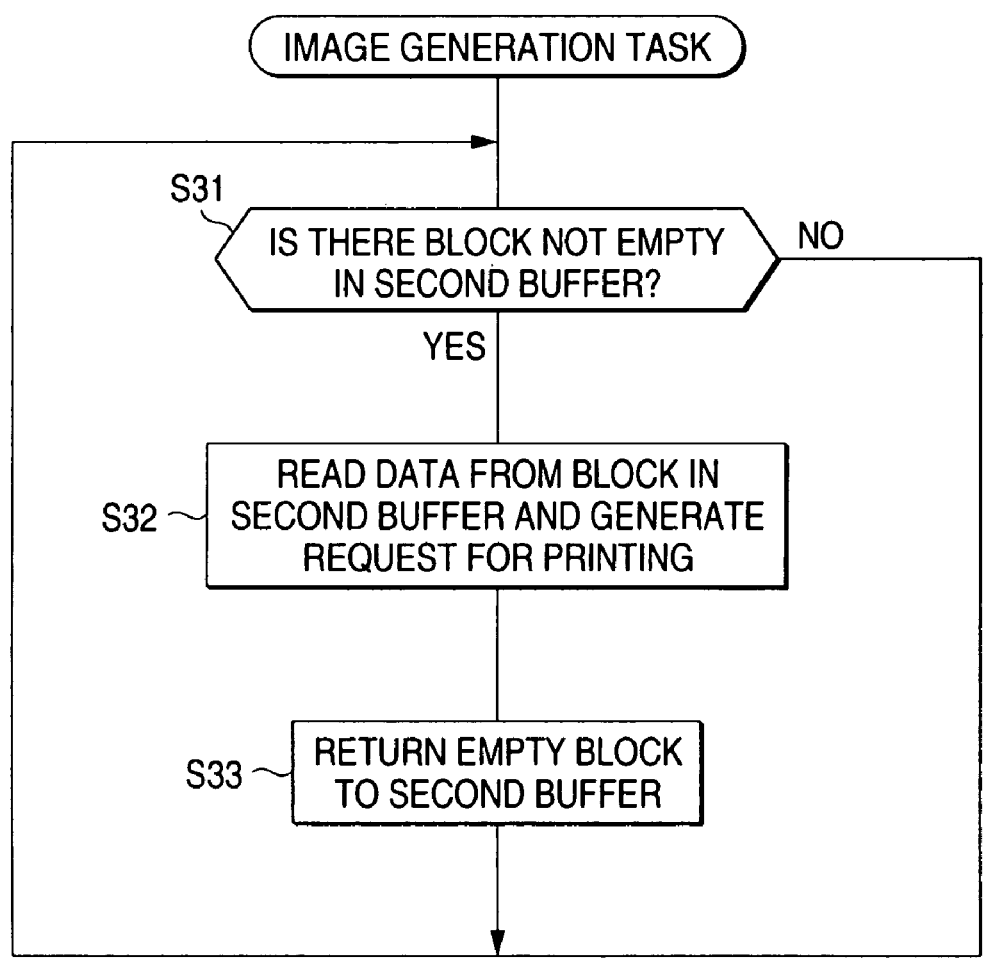
FIG. 8 is a flowchart showing the processing of an image generation task.

Next, FIG. 8 shows the processing of the image generation task 14. First, it is determined whether there is a memory block storing data and not empty in the second buffer memory 22 or not (S31). If there is a memory block not empty in the second buffer memory 22 (S31: YES), one memory block is extracted from the second buffer memory 22, data is read and a request for printing is generated (S32). The empty memory block from which the data is extracted is returned to the second buffer memory (S33). As the printing task is not the object of the present invention, the description of the processing is omitted.

Figure 9:
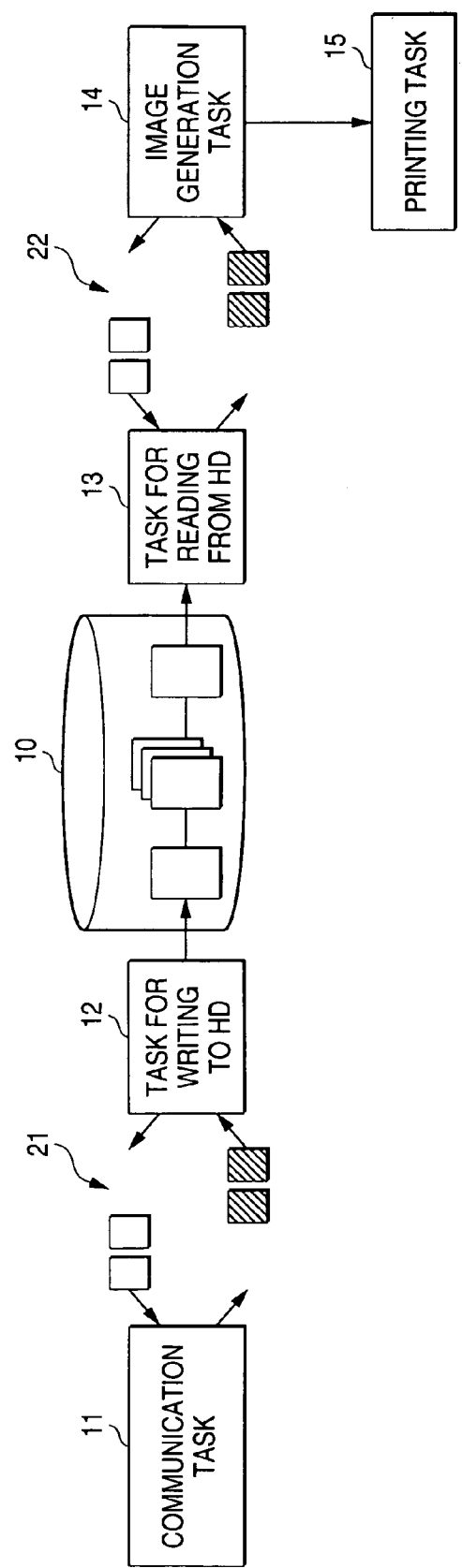
FIG. 9 is an explanatory drawing showing data transfer in a mode via an auxiliary storage.
Figure 10:
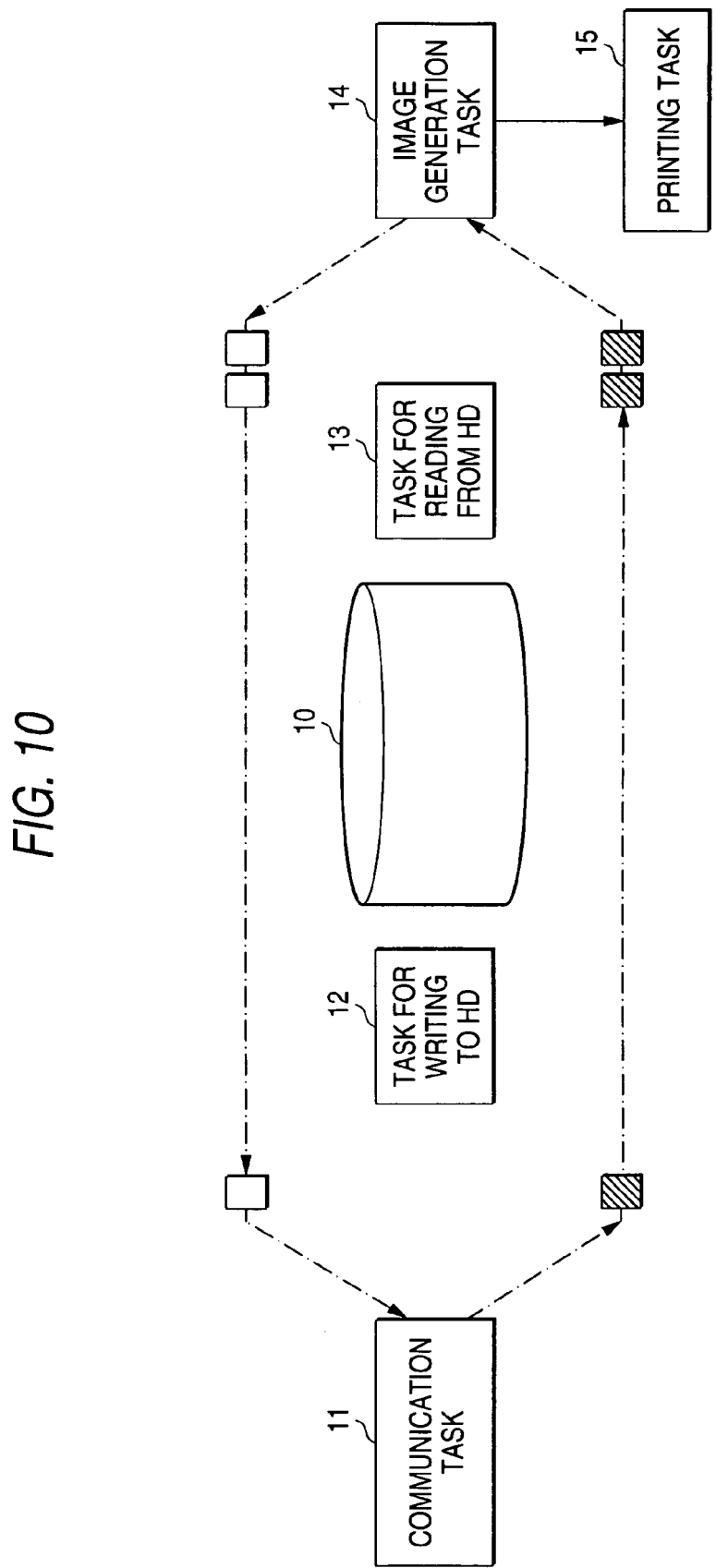
FIG. 10 is an explanatory drawing showing data transfer in a first bypass mode.
Figure 11:
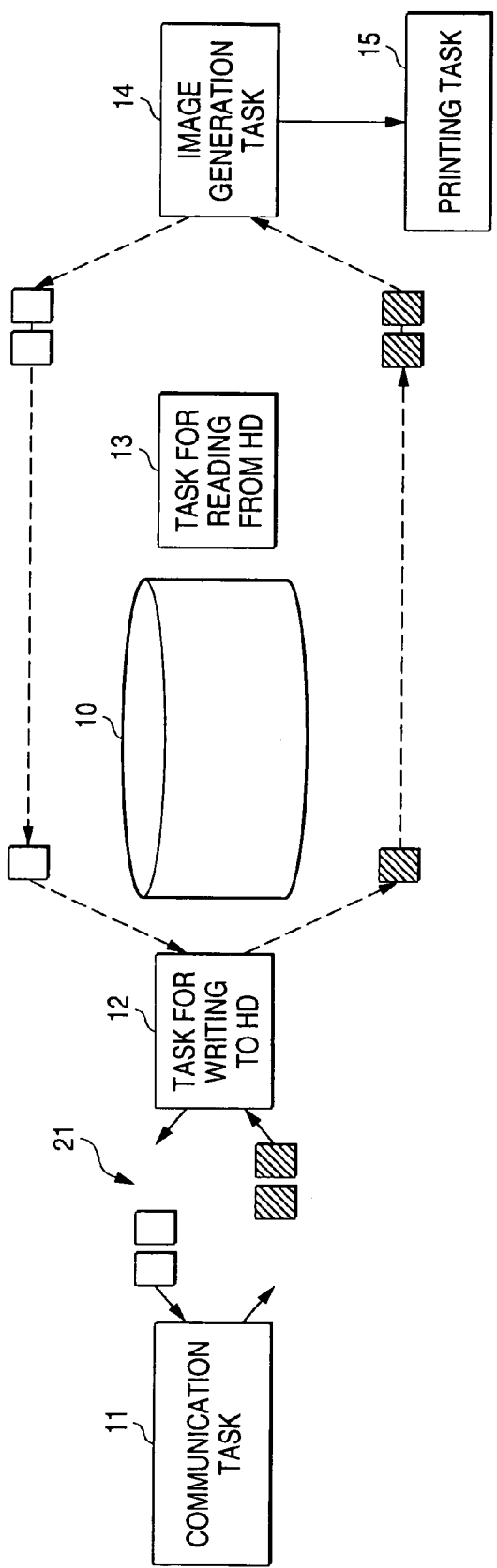
FIG. 11 is an explanatory drawing showing data transfer in a second bypass mode.

According to this embodiment composed as described above, as shown in FIGS. 9 to 11, data can be transferred in a transfer mode according to a data processed state. That is, as shown in FIG. 9, in the mode via the auxiliary storage, received data is stored in HDD 10 via the communication task 11, the first buffer memory 21 and the task for writing to HD 12 and the data stored in HDD 10 can be input to the image generation task 14 via the task for reading from HD 13 and the second buffer memory 22. Therefore, a host computer can be released early. In the first bypass mode shown in FIG. 10, as received data is directly stored in a memory block of the second buffer memory, each processing of the task for writing to HD 12 and the task for reading from HD 13 is saved and data can be promptly input to the image generation task 14. Further, in the second bypass mode shown in FIG. 11, as in the task for writing to HD 12, data is stored in a memory block of the second buffer memory 22 in place of writing data to HDD 10, data can be promptly transferred to the image generation task 14.

Figure 12A:
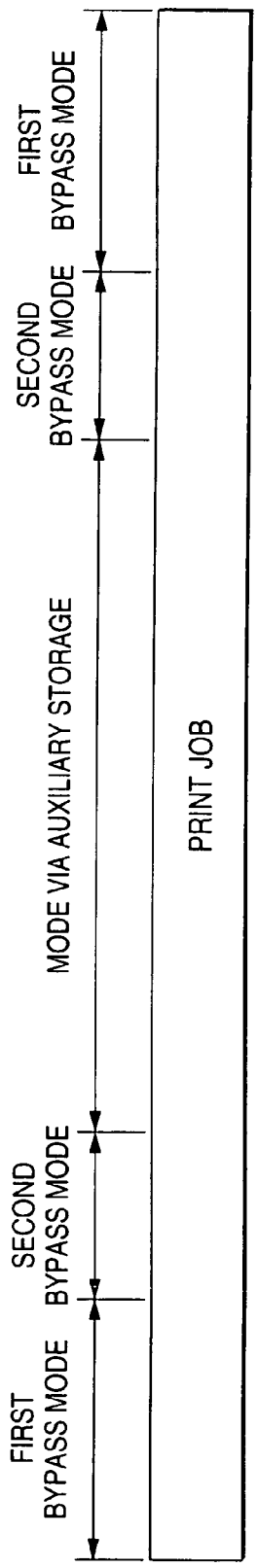
FIGS. 12A to 12C are explanatory drawings showing a state in which transfer modes are switched.

As shown in FIG. 12A, at the first of receiving in a print job, data is transferred in the first bypass mode. Then, when the memory blocks of the second buffer memory 22 are used up for the communication task 11, received data is stored in a memory block of the first buffer memory 21. While the communication task 11 uses the first buffer memory 21, the image generation task 14 receives a full memory block from the second buffer memory 22 and generates a request for printing. As described above, when a memory block in the first buffer memory 21 becomes full in a situation in which no file remaining in HDD 10 exists, the first bypass mode is switched to the second bypass mode by the task for writing to HD 12. In the second bypass mode, the task for writing to HD 12 stores data in a memory block of the second buffer memory 22. When there is no empty memory block in the second buffer memory 22 by switching to the second bypass mode, the second bypass mode is switched to the mode via the auxiliary storage and data is input to the image generation task 14 via HDD 10. Therefore, high speed data transfer in the first and second bypass modes immediately after a print job is received is performed and the second bypass mode is switched to the mode via the auxiliary storage in the vicinity of the middle of the print job.

As all files in HDD 10 are read around the end of the print job, the mode via the auxiliary storage is switched to the second bypass mode. Then, the second bypass mode is switched to the first bypass mode.

Figure 12B:
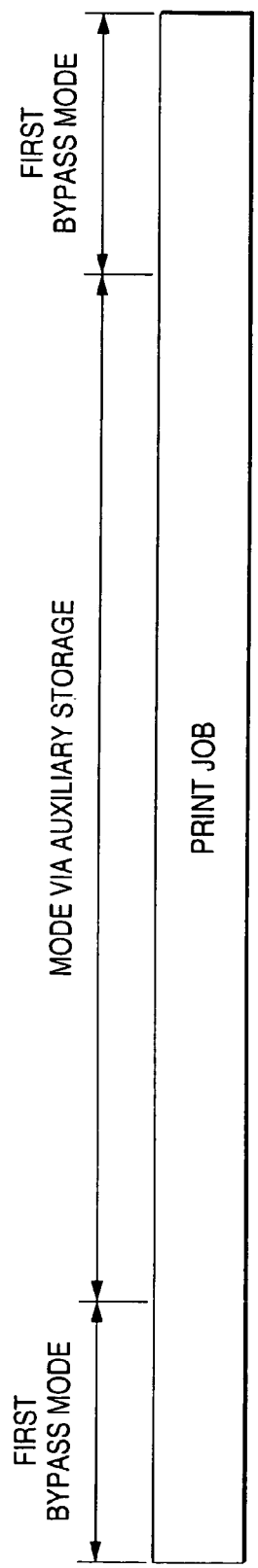
Figure 12C:
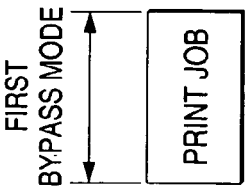

In all print jobs, mode switching shown in FIG. 12A is not performed. A situation of mode switching varies depending upon speed at which a packet is received, the quantity of data included in a print job and the variation of various parameters such as the processing speed of the image generation task 14. For example, as shown in FIG. 12B, if the operation of the communication task 11 is overwhelmingly faster, compared with the operation of the image generation task 14 and the memory blocks of the first buffer memory 21 are used up before a first empty memory block is generated after no empty memory block exists in the second buffer memory 22, a case that the first bypass mode is switched to the mode via the auxiliary storage is also conceivable. If the quantity of data included in a print job is small, data processing only in the first bypass mode may be also performed without being switched to the mode via the auxiliary storage as shown in FIG. 12C.

Besides, processing may be also executed in the order of the first bypass mode, the second bypass mode, the mode via the auxiliary storage and the first bypass mode (the mode via the auxiliary storage is switched to the first bypass mode without being switched to the second bypass mode and printing is terminated). Processing may be also executed in the order of the first bypass mode, the mode via the auxiliary storage, the second bypass mode and the first bypass mode.

Further, in this embodiment, the case that one print job is independently received is described, however, actually, plural printing jobs may be also continuously received and an isolated print job in a while from another print job may be also received. As described above, if plural print jobs are received, the current mode may be switched to any of the first bypass mode, the second bypass mode and the mode via the auxiliary storage. However, in an initial condition and after the processing of all print jobs is completed, data is first transferred in the first bypass mode.

According to this embodiment, the following effect is produced.

First, as the mode via the auxiliary storage (HDD 10) and the bypass mode in which HDD 10 is bypassed are switched based upon a data processed state, processing time can be greatly reduced, compared with a case that the whole print job is stored in HDD 10. As a result, the early release of a host computer enabled by the mode via the auxiliary storage and high speed processing enabled by the bypass mode are compatible and usability is enhanced.

Second, as it is dynamically varied according to a data processed state whether HDD 10 is used or not, the whole processing speed can be enhanced without using a high speed interface, DMA and others.

Third, as data is transferred in the mode via the auxiliary storage without selecting the bypass mode in case a file remaining in HDD 10 exists, processing speed can be enhanced, preventing printing order from being disordered.

Fourth, as not only the first bypass mode from the communication task 11 to the image generation task 14 but the second bypass mode from the task for writing to HD 12 to the image generation task 14 are provided, a high speed data transfer period can be extended and the whole processing time can be reduced.

Fifth, in a multitask printer wherein single CPU 3 processes reading and writing from/to HDD 10, processing time is extended by the quantity of data operation for HDD 10, however, according to the present invention, as the mode via the auxiliary storage and the bypass mode can be switched, the present invention is particularly effective in a multitask printer.

Various addition, changes and others are allowed within a range of the summary of the present invention described in the above embodiment. For example, the present invention can be also realized by instructing a printer to read a predetermined program recorded on a record medium.

Also, the size of a memory block which is a unit of the use of each buffer memory can be also varied according to a data processed state. For example, the size of both memory blocks can be also fixed to approximately 100 kB and can be also varied according to data processing speed inside a printer. The size of a memory block of each buffer memory is not required to be the same and may be also different. However, if block size is the same, it is convenient to transfer data.

Further, the present invention can be also represented as a multitask printer wherein single CPU respectively processes at least the task for writing to HD 12, the task for reading from HD 13 and the image generation task 14.

Further, the printer according to the present invention may be also not only a dedicated printer but a compound device provided with another function such as a copying machine and a facsimile.

As described above, according to the printer and the data processing method of the printer according to the present invention, as the data transfer mode can be varied according to a data processed state, the early release of a host computer utilizing the auxiliary storage and high speed processing by bypassing the auxiliary storage are compatible.

What is claimed is:

1. A printer which can store data received via a network in an auxiliary storage, comprising:
   communication processing means for receiving data via the network;
   image data generation means for interpreting said received data and generating image data;
   printing processing means for printing based upon said generated image data;
   detection means for detecting a state in which said received data is processed:
   a first buffer memory provided between said communication processing means and said auxiliary storage and provided with first plural memory blocks; and
   a second buffer memory provided between said auxiliary storage and said image data generation means and provided with second plural memory blocks,
   wherein the printer includes at least three modes comprising: (i) a mode in which said received data is input to said image data generation means via said auxiliary storage; (ii) a first bypass mode in which said received data is input to said image data generation means via said second buffer memory without being input to either said first buffer memory or said auxiliary storage; and (iii) a second bypass mode in which said received data is input to said image data generation means via said first and second buffer memories without being input to said auxiliary storage,
   wherein selection of a mode to be used is based upon said detected data processing state and an availability of empty blocks of the first and second plural memory blocks.

2. A printer according to claim 1, wherein,
   if data being processed is stored in said auxiliary storage, said mode via the auxiliary storage is selected; and if no data being processed is stored in said auxiliary storage, said bypass mode is selected.

3. A printer according to claim 1, wherein a first bypass mode as said bypass mode is realized when said communication processing means stores data in the memory block of said second buffer memory.

4. A printer according to claim 3, wherein said first bypass mode is switched in case (a1) no memory block storing data exists in said first buffer memory, (a2) no data being processed is stored in said auxiliary storage and (a3) an empty memory block exists in said second buffer memory.

5. A printer according to claim 4, wherein said second buffer memory is set so that capacity is more than the capacity of said first buffer memory.

6. A printer according to claim 1, wherein a second bypass mode as said bypass mode is realized when data stored in the memory block of said first buffer memory is sent to the memory block of said second buffer memory.

7. A printer according to claim 1, wherein a second bypass mode as said bypass mode is realized when data stored in the memory block of said first buffer memory is extracted and is sent to an empty memory block of said second buffer memory.

8. A printer according to claim 1, wherein a second bypass mode as said bypass mode is realized when the memory block storing data of said first buffer memory and an empty memory block of said second buffer memory are transposed.

9. A printer according to any one of claims 6 to 8, wherein said second bypass mode is switched in case (b1) no data being processed is stored in said auxiliary storage, (b2) an empty memory block exists in said second buffer memory and (b3) a memory block storing data exists in said first buffer memory.

10. A printer according to claim 1, wherein said bypass mode includes (i) a first bypass mode in which said communication processing means stores data in the memory block of said second buffer memory and (ii) a second bypass mode in which data stored in the memory block of said first buffer memory is sent to the memory block of said second buffer memory, and said first bypass mode is switched in the following cases:

(a1) no memory block storing data exists in said first buffer memory;

(a2) no data being processed is stored in said auxiliary storage; and (a3) an empty memory block exists in said second buffer memory; and said second bypass mode is switched in the following (b1) no data being processed is stored in said auxiliary (b2) an empty memory block exists in said second buffer and (b3) a memory block storing data exists in said first buffer memory.

11. A printer which can store data received via a network in an auxiliary storage, comprising:

communication processing means for receiving data via the network;

writing means for instructing said auxiliary storage to store data input from the communication processing means;

reading means for reading data stored in said auxiliary storage; image data generation means for interpreting input data and generating image data; printing processing means for printing based upon said generated image data; detection means for detecting data remaining in said auxiliary storage;

a first buffer memory provided between said communication processing means and said writing means and provided with first plural memory blocks; and a second buffer memory provided between said auxiliary storage and said reading means and provided with second plural memory blocks, wherein the printer includes at least three modes comprising: (i) a mode via the auxiliary storage in which data received by said communication processing means is input to said image data generation means sequentially via said first buffer memory, said writing means, said auxiliary storage, said reading means and said second buffer memory; (ii) a first bypass mode in which data received by said communication processing means is input to said image data generation means via said second buffer memory without being input to either said first buffer memory or said auxiliary storage; and (iii) a second bypass mode in which data received by said communication processing means is input to said image data generation means without being input to said auxiliary storage; wherein selection of a mode to be used is based upon said detected data processing state and an availability of empty blocks of the first and second plural memory blocks.

12. A data processing method of a printer provided with an auxiliary storage which can store data received via a network, wherein a mode via the auxiliary storage in which data is transferred via said auxiliary storage and first and second bypass modes in which data is transferred without passing said auxiliary storage are provided;

(1) said mode via the auxiliary storage comprises:

a step for storing data received via the network in an empty memory block of a first buffer memory;

a step for extracting the data from the memory block storing the data of said first buffer memory to store it in said auxiliary storage;

a step for reading the data stored in said auxiliary storage to store it in an empty memory block of said second buffer memory;

a step for extracting the data from the memory block storing the data of said second buffer memory to interpret it thereby generating image data; and a step for printing based upon said generated image data;

(2) said first bypass mode comprises:

a step for storing data received via the network in an empty memory block of the second buffer memory;

a step for extracting the data from the memory block storing the data of said second buffer memory to interpret it thereby generating image data; and a step for printing based upon said generated image data; and (3) said second bypass mode comprises:

a step for storing data received via the network in an empty memory block of the first buffer memory;

a step for extracting the data from the memory block storing the data of said first buffer memory to send it to an empty memory block of said second buffer memory;

a step for extracting the data from the memory block storing the data of said second buffer memory to interpret it thereby generating image data; and a step for printing based upon said generated image data.

13. A data processing method of a printer provided with an auxiliary storage which can store data received via a network, wherein a mode via the auxiliary storage in which data is transferred via said auxiliary storage and first and second bypass modes in which data is transferred without passing said auxiliary storage are provided;

(1) said mode via the auxiliary storage comprises:

a step for storing data received via the network in an empty memory block of a first buffer memory;

a step for extracting the data from the memory block storing the data of said first buffer memory to store it in said auxiliary storage;

a step for reading the data stored in said auxiliary storage to store it in an empty memory block of a second buffer memory;

a step for extracting the data from the memory block storing the data of said second buffer memory to interpret it thereby generating image data; and a step for printing based upon said generated image data;

(2) said first bypass mode comprises:

a step for storing data received via the network in an empty memory block of the second buffer memory;

a step for extracting the data from the memory block storing the data of said second buffer memory to interpret it thereby generating image data; and a step for printing based upon said generated image data; and (3) said second bypass mode comprises:

a step for storing data received via the network in an empty memory block of the first buffer memory;

a step for transposing the memory block storing the data of said first buffer memory and an empty memory block of said second buffer memory;

a step for extracting the data from the memory block storing the data of said second buffer memory to interpret it thereby generating image data; and a step for printing based upon said generated image data.

* * * * *